(12) United States Patent
Huang

(10) Patent No.: US 9,234,607 B2
(45) Date of Patent: Jan. 12, 2016

(54) FAUCET CONTROL MODULE

(71) Applicant: ALEXANDER YEH INDUSTRY CO., LTD., Lukang Chen, Changhua Hsien (TW)

(72) Inventor: Li-Chen Huang, Changhua Hsien (TW)

(73) Assignee: ALEXANDER YEH INDUSTRY CO., LTD., Changhua Hsien (TW)

(*) Notice: Subject to any disclaimer, the term of this patent is extended or adjusted under 35 U.S.C. 154(b) by 202 days.

(21) Appl. No.: 14/080,774

(22) Filed: Nov. 14, 2013

(65) Prior Publication Data

US 2015/0129789 A1  May 14, 2015

(51) Int. Cl.
*F16K 31/60* (2006.01)
*E03C 1/04* (2006.01)
*E03C 1/02* (2006.01)

(52) U.S. Cl.
CPC .................. *F16K 31/60* (2013.01); *E03C 1/021* (2013.01); *E03C 2201/50* (2013.01)

(58) Field of Classification Search
CPC .... E03C 1/0412; E03C 2201/50; F16K 31/60
USPC ........................................................ 137/357
See application file for complete search history.

(56) References Cited

U.S. PATENT DOCUMENTS

| | | | | |
|---|---|---|---|---|
| 4,134,420 A | * | 1/1979 | Okonowitz | 137/315.14 |
| 4,616,673 A | * | 10/1986 | Bondar | 137/315.15 |
| 4,739,788 A | * | 4/1988 | Reback | 137/15.18 |
| 4,842,009 A | * | 6/1989 | Reback | 137/315.15 |
| 4,876,766 A | * | 10/1989 | Cohen | 16/426 |
| 4,961,443 A | * | 10/1990 | Buccicone et al. | 137/315.15 |
| 5,025,826 A | * | 6/1991 | Schoepe et al. | 137/315.15 |
| 7,331,358 B2 | * | 2/2008 | Gallina et al. | 137/315.15 |
| 7,987,869 B2 | * | 8/2011 | Rosko et al. | 137/315.15 |
| 8,672,294 B2 | * | 3/2014 | Huang | 251/291 |
| 2013/0036854 A1 | * | 2/2013 | Huang | 74/543 |
| 2013/0036855 A1 | * | 2/2013 | Huang | 74/543 |
| 2013/0036856 A1 | * | 2/2013 | Huang | 74/543 |
| 2013/0068063 A1 | * | 3/2013 | Huang | 74/543 |

\* cited by examiner

*Primary Examiner* — Craig Schneider
*Assistant Examiner* — Kevin Barss

(57) ABSTRACT

A combination of a faucet handle and a control valve has a faucet, an ornament panel, a positioning plate, a sleeve and a handle; wherein: the faucet is insertable into an existing installation hole in a wall, a connecting section of the faucet is disposed through the installation hole, the connecting section having an outer thread formed on a peripheral surface thereof and a control rod protruding from a center position, the control rod connected to a control member of the faucet.

4 Claims, 5 Drawing Sheets

FAUCET CONTROL MODULE

BACKGROUND OF THE INVENTION

1. Field of the Invention

The present invention relates to a combination of a faucet handle and a control valve, and more particularly to an embedded combination of a faucet handle and a control valve.

2. Description of the Related Art

Currently, most of wall-mounted faucets have an embedded faucet, the faucet has a control rod connected to a handle at one end and to a control member of the faucet at another end. The handle is capable of controlling water flow or temperature via the control rod. An ornament panel is installed through the faucet onto the wall, and the ornament panel is secured with the faucet by at least two screws.

However, the above-mentioned conventional structure has following drawbacks: 1. The installation of the securing screws for the panel require alignment which is very inconvenient. 2. The securing screws does not provide two-dimensional stability, which might cause the panel to be lose. 3. The securing screws are exposed which can affect the appearance.

Therefore, it is desirable to provide a combination of a faucet handle and a control valve to mitigate and/or obviate the aforementioned problems.

SUMMARY OF THE INVENTION

An objective of the present invention is to provide a combination of a faucet handle and a control valve, which is easy to install and provides better stability.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
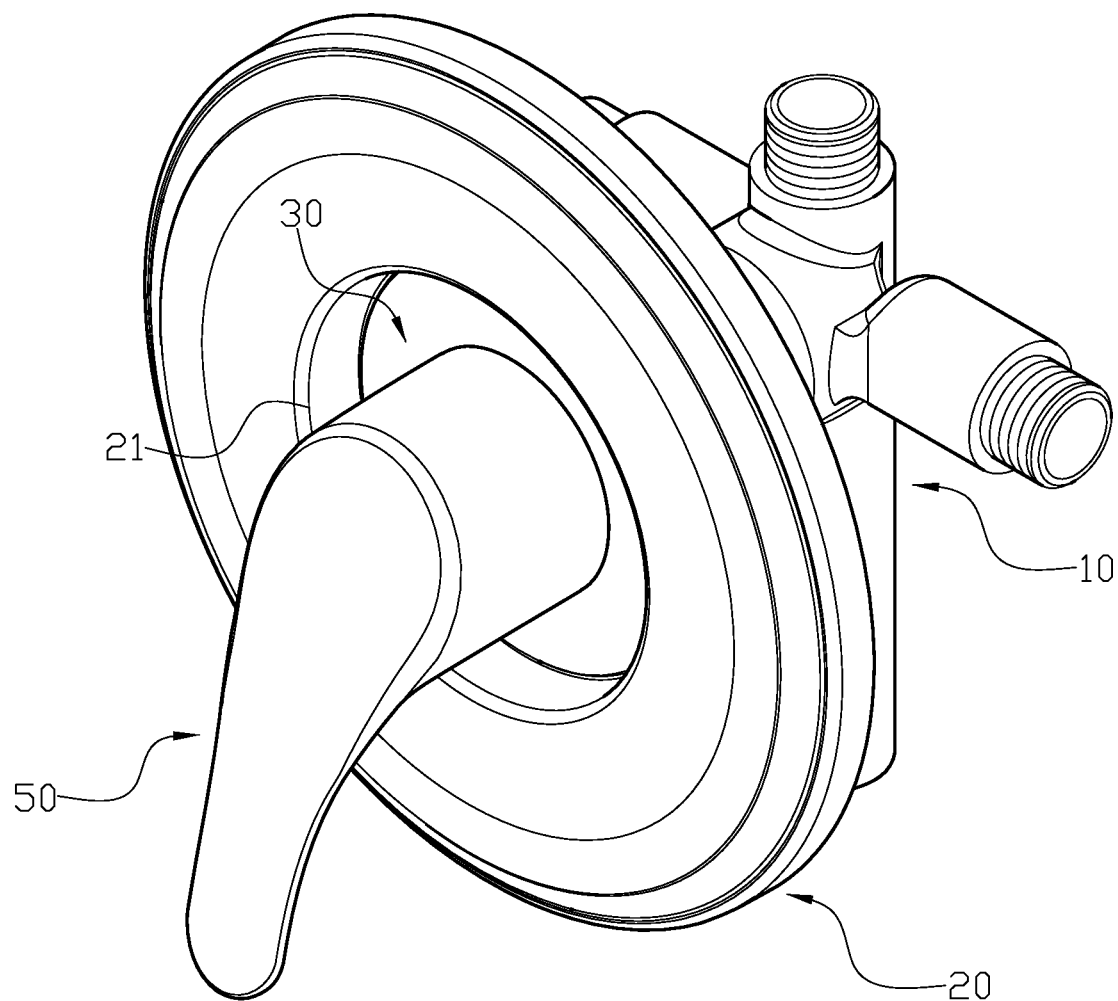
FIG. 1 is a perspective assembly drawing of an embodiment of the present invention.
Figure 2:
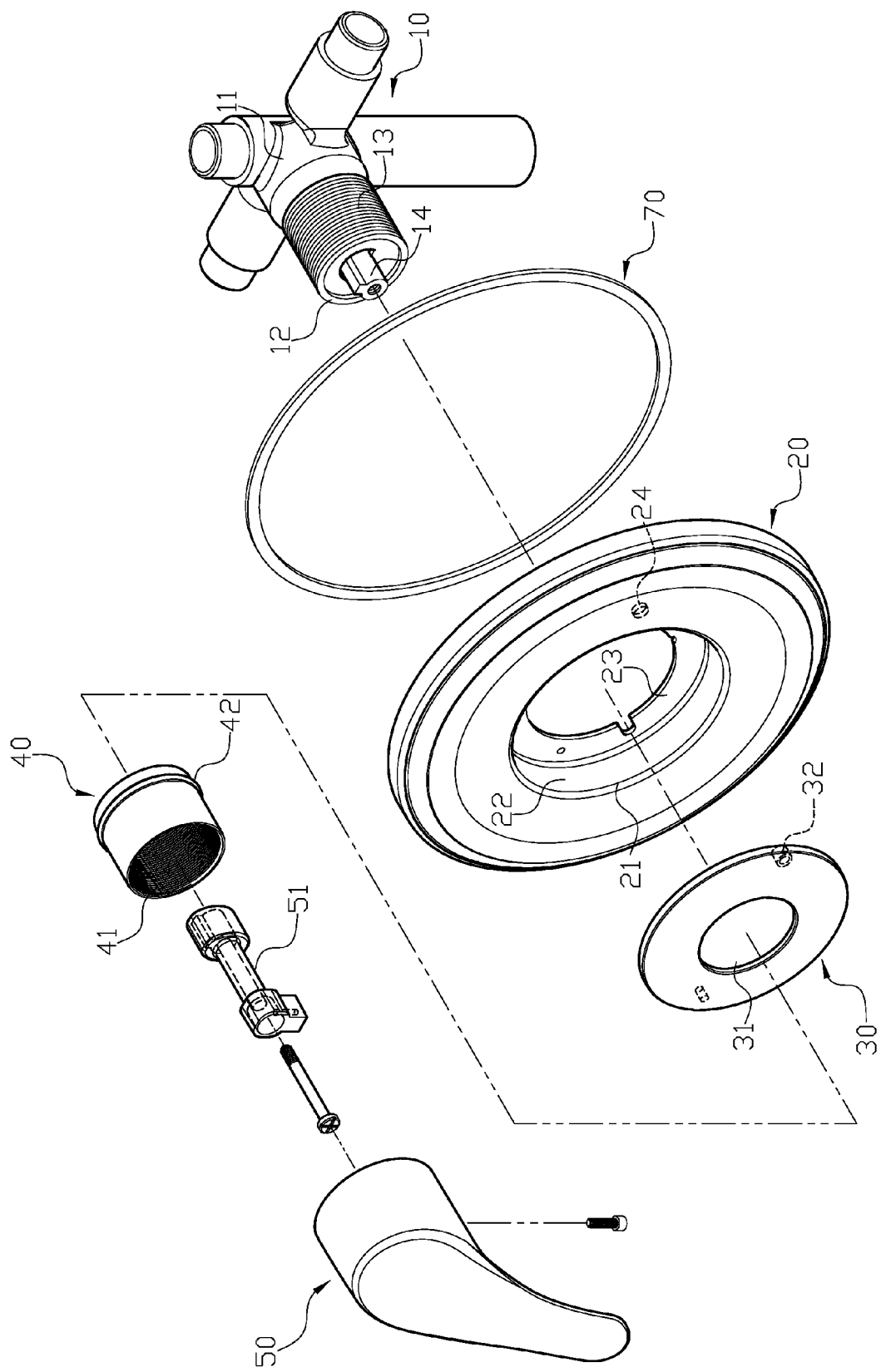
FIG. 2 is a perspective exploded drawing of the embodiment of the present invention.
Figure 3:
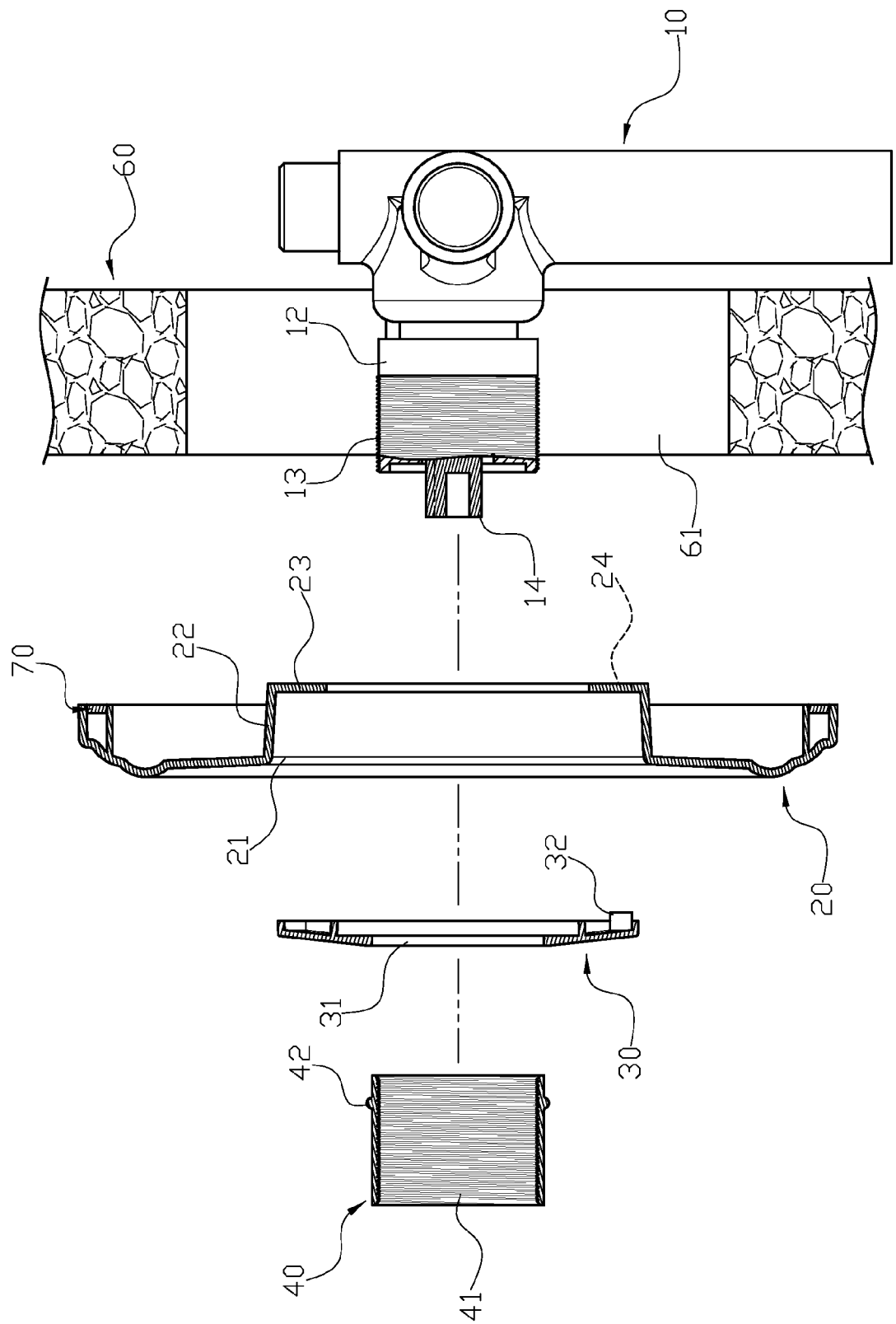
FIG. 3 is an assembly cross-sectional drawing of the embodiment of the present invention.

Please refer to FIG. 1 to FIG. 3. A combination of a faucet handle and a control valve comprising: a faucet 10, an ornament panel 20, a positioning plate 30, a sleeve 40 and a handle 50. The faucet 10 is insertable into an existing installation hole 61 in a wall 60. A connecting section 12 of the faucet 10 is disposed through the installation hole 61. Furthermore, the connecting section 12 has an outer thread 13 formed on a peripheral surface thereof and a control rod 14 protruding from a center position. The control rod 14 is connected to a control member of the faucet 10 and configured to control water flow or water temperature. The ornament panel 20 is a round casing and provided with an opening 21 having an inner loop face 22, and the inner loop face 22 is further connected to a circular lip 23. The circular lip 23 is provided with at least one securing aperture 24. The positioning plate 30 is disposed at a position corresponding to the opening 21 and having a size between the opening 21 and the circular lip 23, and a through aperture 31 at a center position. The sleeve 40 is a hollow tube with an inner thread 41 configured to engage with the outer thread 13 of the connecting section 23 and having a circular protrusion 42 at a predetermined position on an outer periphery. The handle 50 is provided with a connecting member 51 capable of being connected to the control rod 14.

Figure 4:
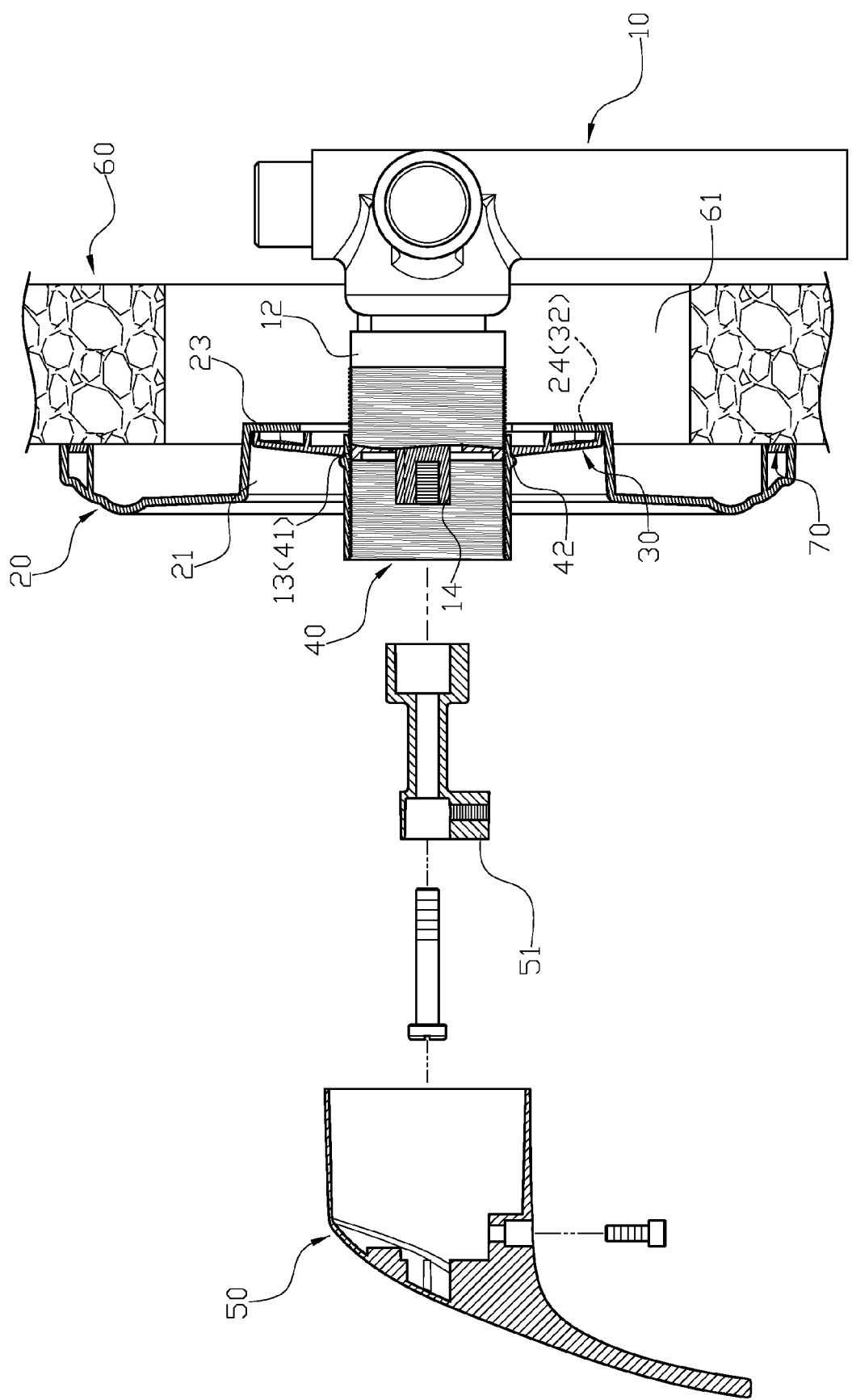
FIG. 4 is a schematic drawing of the embodiment of the present invention.
Figure 5:
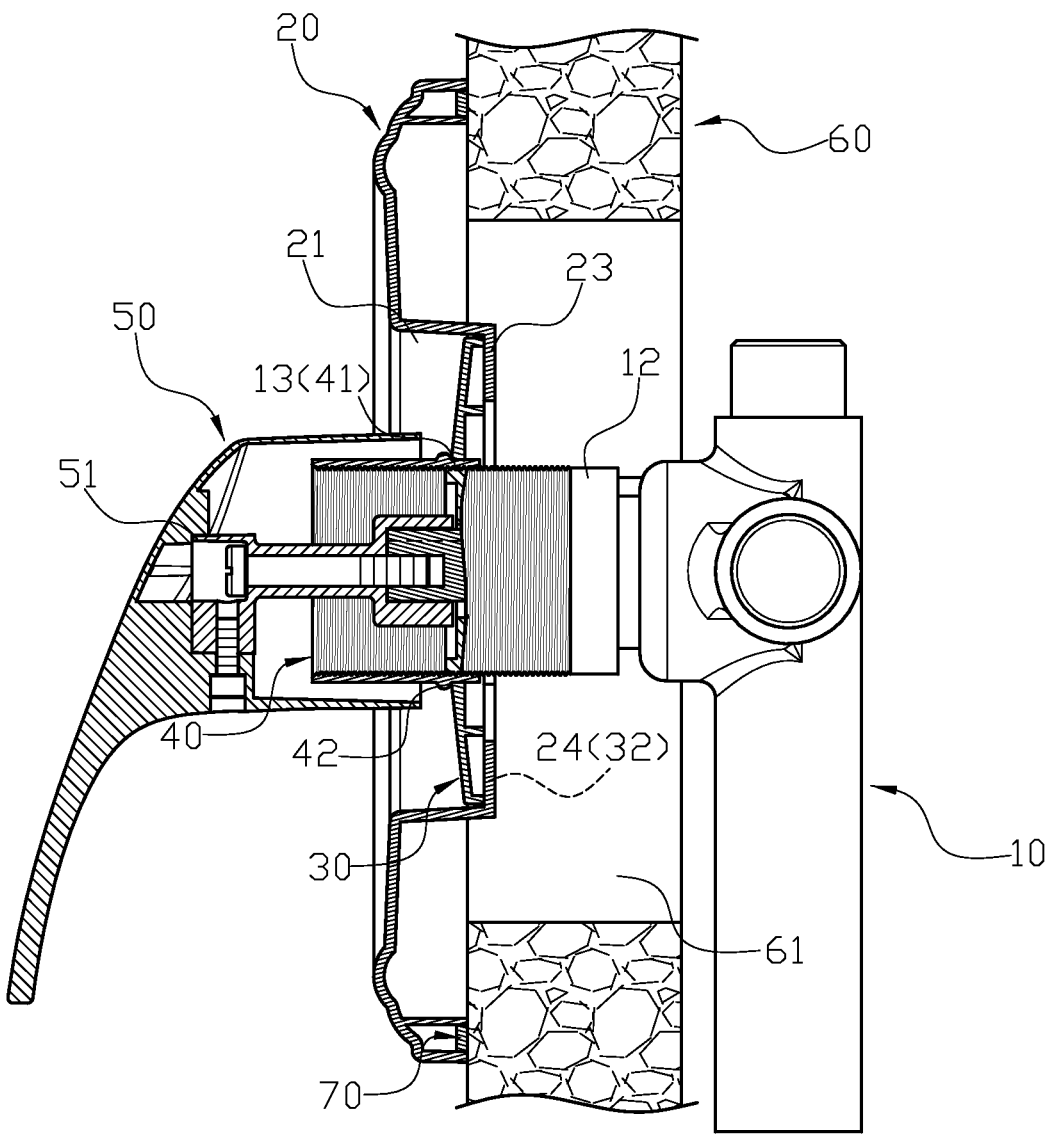
FIG. 5 is another schematic drawing of the embodiment of the present invention.

Please refer to FIG. 4 and FIG. 5. The opening 21 of the ornament panel 201 is jacketed onto the connecting section 12 of the faucet 10 such that the ornament panel 20 covers the installation hole 61. The though aperture 31 of the positioning plate 30 accepts the connecting section 12, and the positioning plate 30 is disposed in the opening 21 of the ornament panel 20. The inner thread 41 of the sleeve 40 engages with the outer thread 13 of the connecting section 12, and the positioning plate 30 is sandwiched between the circular protrusion 42 and the circular lip 23 of the ornament panel 20 to secure the ornament panel 20. Moreover, the connecting member 51 of the handle 50 s respectively connected to the sleeve 40 and the control rod 14 such that the handle 50 is jacketed onto the sleeve 40. The circular lip 23 of the ornament panel 20 is provided with at least one securing aperture 24, and the positioning plate 30 has at least one corresponding securing pin 32 such that the positioning plate 30 is engaged with the ornament panel 20. In addition, a sealing ring 70 is disposed between the ornament panel 20 and the wall 60.

The above-mentioned combination of a faucet handle and a control valve has following benefits: 1. With the engagement between the inner and outer threads 41, 13 of the sleeve 40 and the connecting section 12, the positioning plate 30 is overlapped on the circular lip 23 the ornament panel 20 without alignment requirement for the assembly. 2. The ornament panel 20 is assembled with better stability. 3. The entire assembly structure has a compact structure.

Although the present invention has been explained in relation to its preferred embodiment, it is to be understood that many other possible modifications and variations can be made without departing from the spirit and scope of the invention as hereinafter claimed.

What is claimed is:

1. A combination of a faucet handle and a control valve comprising: a faucet, an ornament panel, a positioning plate, a sleeve and a handle; wherein: the faucet is insertable into an existing installation hole in a wall, a connecting section of the faucet is disposed through the installation hole, the connecting section having an outer thread formed on a peripheral surface thereof and a control rod protruding from a center position, the control rod connected to a control member of the faucet;

the ornament panel is provided with an opening having an inner loop face, and the inner loop face is further connected to a circular lip;

the positioning plate is disposed at a position corresponding to the opening and having a size between the opening and the circular lip, and a through aperture at a center position;

the sleeve is a hollow tube with an inner thread configured to engage with the outer thread of the connecting section and having a circular protrusion at a predetermined position on an outer periphery; and the handle is provided with a connecting member capable of being connected to the control rod;

further characterized in that:

the opening of the ornament panel is jacketed onto the connecting section of the faucet such that the ornament panel covers the installation hole;

the though aperture of the positioning plate accepts the connecting section, and the positioning plate is disposed in the opening of the ornament panel;

the inner thread of the sleeve engages with the outer thread of the connecting section, and the positioning plate is sandwiched between the circular protrusion and the circular lip of the ornament panel to secure the ornament panel; and the connecting member of the handle is respectively connected to the sleeve and the control rod such that the handle is jacketed onto the sleeve.

2. The combination of a faucet handle and a control valve as claimed in claim 1, wherein the ornament panel is a round casing.

3. The combination of a faucet handle and a control valve as claimed in claim 1, wherein the circular lip is provided with at least one securing aperture, and the positioning plate has at least one corresponding securing pin.

4. The combination of a faucet handle and a control valve as claimed in claim 1, wherein a sealing ring is disposed between the ornament panel and the wall.

\* \* \* \* \*